July 22, 1941.  F. H. GULLIKSEN  2,249,819
INVERTER CIRCUIT FOR VIBRATORY HAMMERS
Filed Dec. 23, 1938

Current through Coil 1

Current through Coil 2

INVENTOR
Finn H. Gulliksen

Patented July 22, 1941

2,249,819

UNITED STATES PATENT OFFICE 2,249,819

INVERTER CIRCUIT FOR VIBRATORY HAMMERS

Finn H. Gulliksen, Pittsburgh, Pa., assignor to Westinghouse Electric & Manufacturing Company, East Pittsburgh, Pa., a corporation of Pennsylvania Application December 23, 1938, Serial No. 247,445

8 Claims. (Cl. 172—240)

My invention relates to an electric hammer, more specifically to a particular inverter circuit for operating a vibratory hammer.

In the past, it has been customary to use a motor generator set as a source for operating electric hammers. Such an arrangement embodies a pair of rectifier tubes and a pair of hammer operating coils, all of which are fed by the generator in such a way that one coil will be energized during one half cycle of an alternating-current voltage, and the other coil will be energized during the other half cycle thereof. In mines, electric hammers are extensively used but they must be transported in mine cars. Difficulty has been experienced in transporting motor generator sets therefor due to their excessive weight.

In order to obtain maximum hammer impact, it is important that the alternating-current frequency be kept as close as possible to the mechanical resonant frequency of the hammer. Inasmuch as the frequency of the generator varies with load as well as with the armature voltage of the driving motor, it has been found in practice that it is difficult to maintain the frequency within acceptable limits without resorting to speed regulating equipment. It has been proposed to feed the hammer actuating coils by an inverter circuit in which an alternating-current source is used to alternately impress a positive potential on the grids of two grid controlled discharge tubes to effect alternate energization of the coils. It has been found, however, that due to the inherent commutating characteristics of these circuits, there is a considerable overlap of current in the two coils, the result of which is to greatly reduce the effective magnetic pull on the armature or hammer striking device for a given effective coil current. Another undesirable characteristic of the standard inverter circuit operating a hammer near the resonant frequency is that the space location of the armature relative to the applied voltage wave changes 180 degrees when the applied frequency varies from a value below the resonant frequency to a value above the resonant frequency. The result of this is that the inverter fails to commutate and the equipment must be shut down and restarted.

It is, of course, possible to reduce the effect of this 180 degrees phase shift by introducing damping in the tube circuit by means of series resistance, but in order to obtain stable operation, tests have shown that sufficient resistance must be inserted so that the operating efficiency of the equipment would be very low, in the neighborhood of about 10%, therefore, such scheme is not practicable.

An object of my invention is to provide a specific inverter circuit which is free from commutation failure.

Another object of my invention is to provide a simple, inexpensive, but reliable inverter circuit for operating an electric hammer.

Another object of my invention is to provide an efficient inverter circuit in which a relatively small amount of energy loss is present.

Other objects and advantages will become more apparent from a study of the following specification when considered in conjunction with the accompanying drawing, in which.

Figure 1:
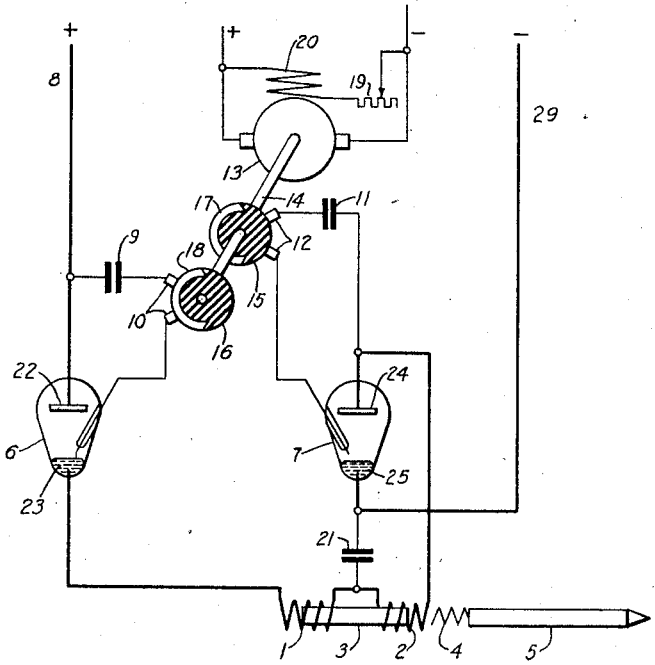
Figure 1 is a schematic showing of an inverter circuit for operating a vibratory hammer, which circuit embodies the principles of my invention.

Referring to Fig. 1, numerals 1 and 2 denote a pair of coils which are adapted to be alternately energized, thereby causing reciprocation of an armature 3 contained therebetween. As the armature 3 moves to the right, it compresses a spring 4, thus striking a tool 5, such as, for example, a hammer. The inverter circuit for effecting alternate energization of coils 1 and 2 comprises a pair of electric discharge tubes of the immersed starting electrode type 6 and 7 which are connected in series with coils 1 and 2 across conductors 8 and 29, which conductors are fed by a direct-current source of potential. In the igniter circuit of tube 6, there is connected a condenser 9 and a pair of contact elements 10, and likewise in the igniter circuit of tube 7, there is connected a condenser 11 and pair of contact elements 12.

An electric motor 13, which is energized by a constant direct-current source rotates a shaft 14, which shaft has rigidly mounted thereon a pair of insulating discs 15 and 16, and upon discs 15 and 16 are mounted contact segments 17 and 18, respectively. The speed of motor 13 may be varied by any suitable means, such as a variable resistor 19 acting to change the excitation of field coil 20.

The operation of the device is as follows:

When contact segment 18 bridges contact elements 10 (as shown in Fig. 1), a current flows from the conductor 8 through condenser 9, contact elements 10, starting electrode and cathode 23 of the tube 6, coil 1, a condenser 21 to the negative terminal 29 of the direct-current source. This current flow which continues as long as the condensers are being charged initiates a cathode spot on the cathode material 23, which may be, for example, mercury, and since a direct current potential exists between anode 22 and cathode 23, a breakdown or discharge of tube 6 will be effected. Therefore, current will now flow from conductor 8 across the anode 22 and cathode 23 of tube 6, coil 1, condenser 21 to the negative terminal 29, this current being effective to charge condenser 21. When the condenser is fully charged, the current will cease to flow. Now condenser 9 which has been charged will discharge from anode 22 to cathode 23 of tube 6.

In the next half revolution of shaft 14, contact segments 17 will bridge contact elements 12, thereby causing a small discharge current to flow from the charged condenser 21 through coil 2, condenser 11, the starting electrode and cathode 25 of tube 7, thence to conductor 29. This will effect initiation of a cathode spot on cathode 25 and effect ionization or breakdown of tube 7. Hence, condenser 21 will thereafter discharge through coil 2 and from anode 24 to cathode 25 of tube 7 to conductor 29. When the discharge of condenser 21 is substantially completed, charged condenser 11 will discharge through tube 7 from anode 24 to cathode 25.

As this cycle is repeated periodically, it will be seen that coils 1 and 2 would become alternately energized, thereby causing vibration or reciprocation of armature 3, which armature intermittently strikes tool 5 through spring 4. The direct-current supply voltage and the capacity of condenser 21 are so chosen with reference to the rated current and the inductance of coil 1, that the current through coil 1, that is, the charging current for condenser 21 is reduced to zero before contact elements 12 are bridged to ignite tube 7. For example, if condenser 21 is small, less time will be necessary to charge the same. Likewise, contact elements 10 are closed while contact elements 12 are opened and vice versa, there being no overlapping of currents in the coils such as would be caused by the closing of both pairs of contact elements at the same time.

Figures 2, 3:
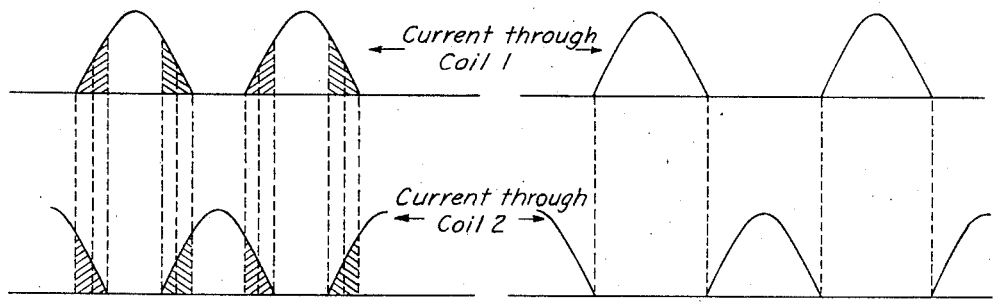
Fig. 2 shows the overlapping current characteristic in a pair of operating coils in a standard inverter.
Fig. 3 shows a non-overlapping current characteristic in a pair of operating coils in accordance with the teachings of my invention.

Thus current characteristics in coils 1 and 2 are obtained, as shown in Fig. 3, wherein it is shown that at any instant current is either through coil 1 or through coil 2, never through both at the same time, thus distinguishing from the current characteristics shown in Fig. 2 of the standard inverter in which there is an overlapping of currents in coils 1 and 2 and, therefore, a pull in an opposite direction on armature 3 effecting a waste of power. It is obvious of course, that by varying the lengths of the contact segments 17—18, or by varying either the speed of motor 13 or the diameter of discs 15 and 16, different current characteristics simulating those in Fig. 3 may be obtained.

Condensers 9 and 11 are used primarily to protect discharge through tubes 6 and 7 in case of delayed pick-up. Of course, fuses can be substituted therefor, but it has been found that considerable blowout will be experienced; therefore, condensers 9 and 11 are more satisfactory.

I am, of course, aware that others, particularly after having had the benefit of the teachings of my invention, may devise other inverter circuits embodying my invention, and I, therefore, do not wish to be limited to the showings made in the drawing and the descriptive disclosure hereinbefore made, but wish to be limited only by the scope of the appended claims and such prior art that may be pertinent.

I claim as my invention:

1. An electric hammer comprising, in combination, a direct current source, a pair of coils, an armature which is adapted to be attracted by either of said coils, a pair of electric discharge devices of the immersed starting electrode type which devices are inherently capable of conducting high currents, said discharge device having an igniter circuit, a condenser connected in series with one of said discharge devices and one of said coils, across said direct-current source, the other discharge device and coil being serially connected in a parallel circuit across said condenser, a pair of switches, each connected in the igniter circuit of said discharge devices, and means for periodically and successively closing said switches.

2. An operating means for an electric hammer comprising, in combination, a direct current source, a pair of coils, an armature which is adapted to be attracted by either of said coils, a pair of electric discharge devices of the immersed starting electrode type which devices are inherently capable of conducting high currents, a condenser connected in series with one of said coils and one of said discharge devices, all three being in series relationship with said direct current source, the other discharge device and coil being serially connected in a parallel circuit bridging said condenser, each of said discharge devices having an igniter circuit which includes a switch, and means for alternately closing one switch while opening the other, in periodic succession.

3. An operating means for an electric hammer comprising, in combination, a pair of coils, an armature which is adapted to be attracted by either of said coils, a pair of electric discharge devices of the immersed starting electrode type which devices are inherently capable of conducting high currents, and a direct-current source which are connected in series with said coils, a condenser, one of said coils and one of said discharge devices forming a series circuit bridged by said condenser, all three being in series relationship with each other, each of said discharge devices having an igniter circuit which includes a switch and a condenser, and means for alternately closing one switch while opening the other, in periodic succession.

4. An operating means for an electric hammer comprising, in combination, a pair of coils, an armature which is adapted to be attracted by either of said coils, a pair of electric discharge devices of the immersed starting electrode type which devices are inherently capable of conducting high currents and a direct-current source which are connected in series with said coils, a condenser, one of said coils being serially connected to one of said discharge devices both of which are bridged by said condenser, each of said discharge devices having an igniter circuit which includes a switch, and an electric motor of adjustable speed for alternately closing one switch while opening the other in periodic succession.

5. An operating means for an electric hammer comprising, in combination, a pair of coils, an armature which is adapted to be attracted by either of said coils, a pair of electric discharge devices of the immersed starting electrode type which devices are inherently capable of conducting high currents and a direct-current source which are connected in series with said coils, one of said coils being serially connected to one of said discharge devices, a condenser which bridges said last mentioned coil and discharge device, all three latter mentioned elements being in series relationship with each other, each of said discharge devices having an igniter circuit which includes a switch and a condenser, and an electric motor of adjustable speed for alternately closing one switch while opening the other in periodic succession.

6. An operating means for an electric hammer comprising, in combination, a pair of coils, an armature which is adapted to be attracted by either of said coils, a pair of electric discharge devices of the immersed starting electrode type which devices are inherently capable of conducting high currents comprising an anode, a cathode and a starting electrode in contact with said cathode, a direct-current source connected in series with said discharge devices and said coils, an igniter circuit connected between the anode and cathode of each of said discharge devices said igniter circuit including a condenser and a switch, another condenser connected across a series circuit formed by one of said coils and one of said discharge devices, all three of the latter mentioned elements being in series relationship with each other, and means for alternately closing one switch while opening the other in periodic succession.

7. An operating means for an electric hammer comprising, in combination, a pair of coils, an armature which is adapted to be attracted by either of said coils, an electric discharge device of the immersed ignition electrode type which is inherently capable of conducting high currents comprising an anode, a cathode and an ignition electrode in contact with said cathode, a source of direct current energy, a series circuit including the positive terminal of said source, the anode, the cathode, one of said coils, a condenser and the negative terminal, a second electric discharge device like the first, a second series circuit including the anode and cathode of the second discharge device, the said condenser, the second coil back to the anode of the second discharge device, an igniter circuit shunting the anode of the first discharge device, said igniter circuit including a condenser, a switch and the ignition electrode, a second igniter circuit like the first shunting the anode of the second discharge device, and motor operated means for alternately operating the switches in said igniter circuits to thus alternately ignite said discharge devices, whereby ignition of the first discharge device causes it to operate, from the source of direct current to thus energize the said one coil and charge the first named condenser and the ignition of the second discharge device causes it to operate, from said first named condenser, to thus energize the second, or other, coil.

8. An operating means for an electric hammer comprising, in combination, a pair of coils, an armature which is adapted to be attracted by either of said coils, an electric discharge device of the immersed ignition electrode type which is inherently capable of conducting high currents comprising an anode, a cathode and an ignition electrode in contact with said cathode, a source of direct current energy, a series circuit including the positive terminal of said source, the anode, the cathode, one of said coils, a condenser and the negative terminal, a second electric discharge device like the first, a second series circuit including the anode and cathode of the second discharge device, the said condenser, the second coil back to the anode of the second discharge device, an igniter circuit shunting the anode of the first discharge device, said igniter circuit including a condenser, a switch and the ignition electrode, a second igniter circuit like the first shunting the anode of the second discharge device, and motor operated means for alternately operating the switches in said igniter circuits to thus alternately ignite said discharge devices, whereby ignition of the first discharge device causes it to operate, from the source of direct current to thus energize the said one coil and charge the first named condenser and the ignition of the second discharge device causes it to operate, from said first named condenser, to thus energize the second, or other, coil, the time constants of the elements included in the coil circuits and the timing of the ignition being such that at any instant current flows either through the first coil or the second coil but never through both coils at the same time.

FINN H. GULLIKSEN.